Sept. 25, 1956 J. DIONISOTTI 2,764,387
ROCK DRILL ADAPTED TO INJECT FLUID INTO A BORE HOLE
Filed Jan. 15, 1953 2 Sheets-Sheet 2
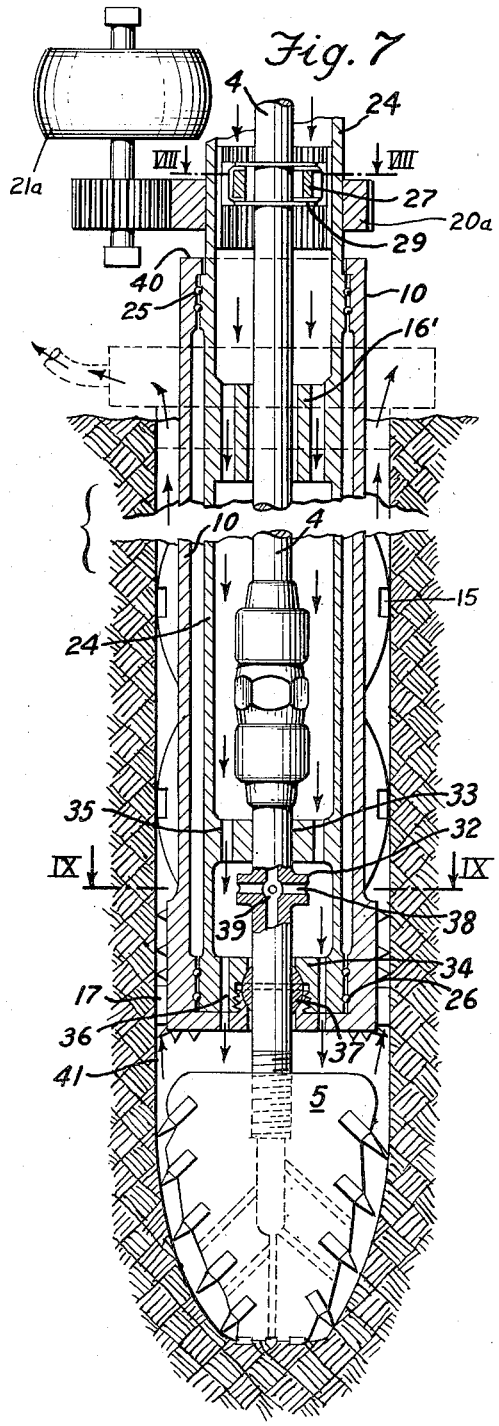
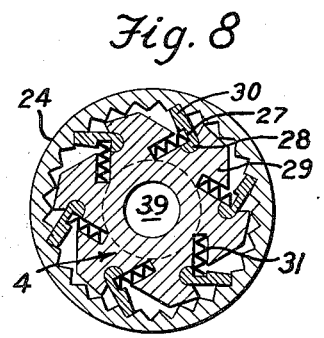
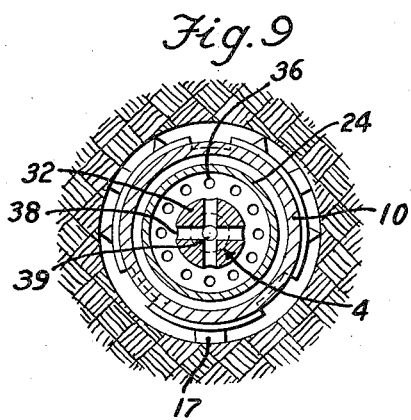
INVENTOR
JOSEPH DIONISOTTI
BY
Young, Emery + Thompson
ATTORNEYS United States Patent Office 2,764,387
Patented Sept. 25, 1956

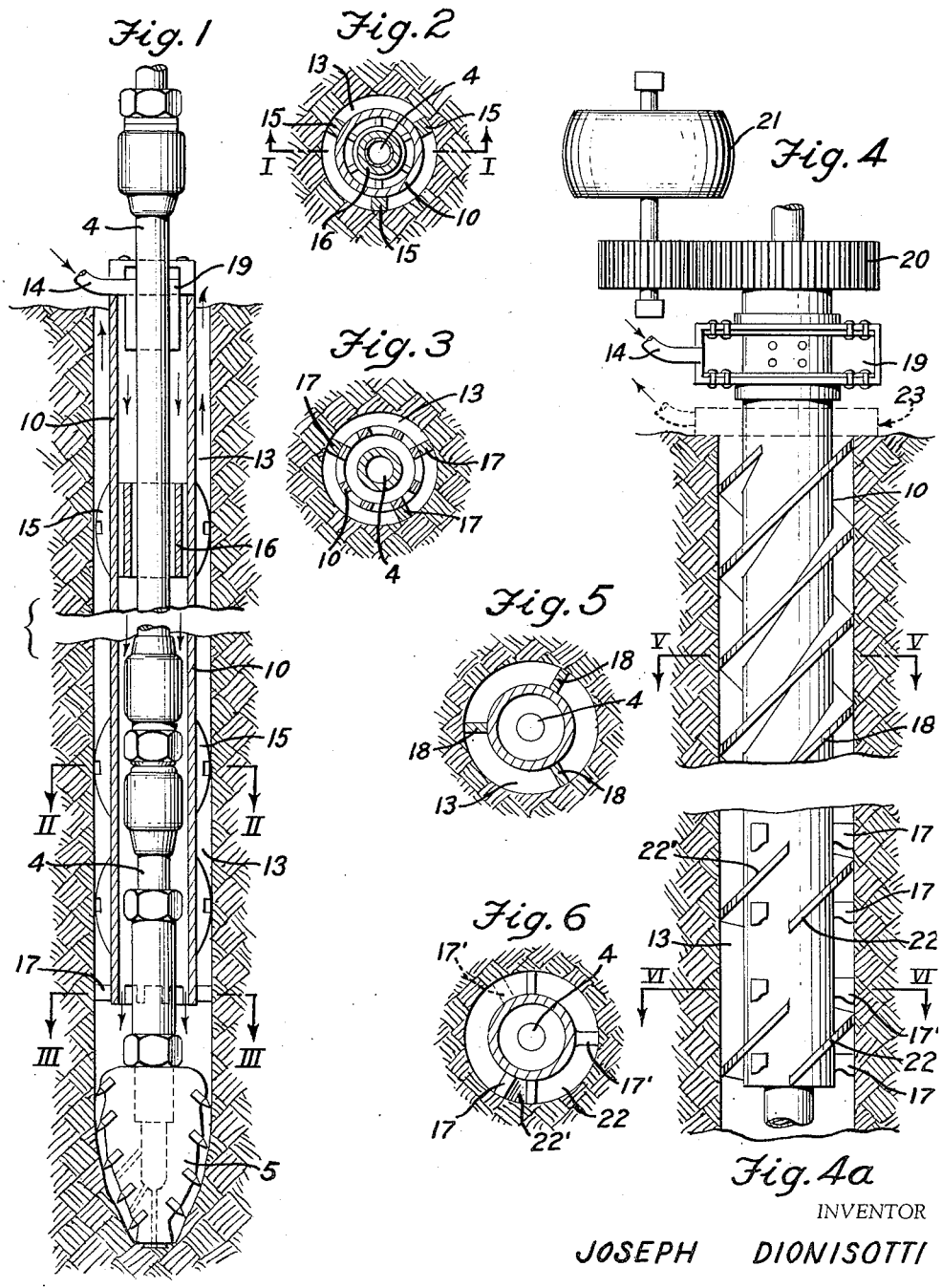

2,764,387

ROCK DRILL ADAPTED TO INJECT FLUID INTO A BORE HOLE

Joseph Dionisotti, Monthey, Switzerland

Application January 15, 1953, Serial No. 331,354

Claims priority, application Switzerland February 6, 1952

7 Claims. (Cl. 255—19)

My invention has for its object a rock drill steel shank for simultaneously injecting air and water into a bore hole and removing the latter speedily with the waste produced by the drilling of the rocks.

According to my invention, the steel shank is provided with a rotary device including at least one tube coaxial with the shank and through which fluid under pressure may be injected into the annular space between the tube and the steel shank, to flow towards the bit or cutting edge positioned at the bottom of the bore hole. The rotation of said device draws along with it the steel shank so as to release the bit or cutting edge, while overcoming the resistance produced by the wedging of the said bit or cutting edge and furthering the drive of the steel shank during its rotation and, if desired, producing a rotation of said shank without any auxiliary arrangement being required.

I have illustrated by way of example in the accompanying drawings three preferred embodiments of my invention. In said drawings:

Figs. 1 to 3 illustrate a first embodiment, Fig. 1 being an elevational cross-sectional view through line I—I of Fig. 2 of the steel and associated device, as positioned inside the bore hole, while Fig. 2 is a cross-sectional view through line II—II of Fig. 1 and Fig. 3 is a cross-section, through line III—III, of Fig. 1 of the end of the tube beyond the bit or cutting edge.

Figs. 4 to 6 relate to a second embodiment, the upper part of Fig. 4 being an elevational partially sectional view of a portion of the rotary device positioned inside the bore hole, while Fig. 5 is a sectional plan view through line V—V of Fig. 4; on the other hand, Fig. 4a shows a modification of said second embodiment and Fig. 6 is a sectional plan view through line VI—VI of Fig. 4a.

Lastly, Figs. 7 to 9 illustrate a third embodiment, Fig. 7 being a vertical cross-section through the axis of the bore showing the rotary device mounted on the steel shank, while Fig. 8 is a horizontal sectional view through line VIII—VIII of Fig. 7, said section passing through the inner tube of the means releasing the cutting edge and showing the auxiliary driving mechanism of the steel shank; as to Fig. 9, it is a horizontal sectional view, through line IX—IX of Fig. 7, of the axial releasing means and of the means providing for the passage of the fluid under pressure together with the exhaust of the waste material towards the outside of the tube.

In the first embodiment (Figs. 1 to 3), the steel shank is housed inside the bore hole with its cutting edge 5 lying in register with the point it has engaged in the wall of the said bore hole. The fluid under pressure, such as water and/or air, is injected, in accordance with requirements, by the pipe 14 into the pipe 10 from above ground to flow towards the bottom of the bore hole, the water being delivered independently of or simultaneously with the air, according to circumstances. The waste produced by the boring and the air and/or water injected under pressure are then removed through the annular space 13 comprised between the tube 10 and the wall of the bore hole.

The whole arrangement is held coaxially inside the bore by means of blocks 15 secured to the tube 10. Said blocks 15 are e. g. arranged at 120° from one another at the periphery of the tube, as illustrated in Fig. 2.

At the end of the tube 10 facing the cutting edge 5 are provided projecting cutter-shaped parts 17 having two sharp edges of which one is parallel with the axis while the other extends radially and faces the direction of progression in order to cooperate with the blocks 15 in the rectilinear guiding during the drilling operation while smoothing the wall of the bore hole.

In the second embodiment illustrated in Figs. 4 to 6, the tube 10 is located axially of the bore hole through the agency of a metal strip 18 wound helically and extending edgewise with reference to the periphery of the tube. This helical strip serves the purpose of the blocks 15 and serves for holding the arrangement axially in the bore hole. The waste material together with the compressed fluid are exhausted through the annular space between the tube and the wall of the bore hole, whereby they rise more speedily above ground surface, said upward movement being furthered by the helical winding of the strip 18.

The tube 10 is caused to rotate independently of the movement imparted to the steel shank by the drilling machine, the rotation of the tube 10 being produced through a gear-work 20 controlled for instance by a belt driven by a transmission pulley 21. This arrangement is shown in Fig. 4 and may obviously be used as well in the case of Fig. 1.

It is also possible, according to an embodiment illustrated in the Fig. 4a and cross-sectionally in Fig. 6, to insert between the projecting parts 17—17' located at the lower end of the tube 10, a metal strip subdivided into elements 22—22', said elements being laid along half-circumferences and being shifted with reference to one another in a diametrical direction, so as to form baffled passageways which ensure the rectilinearity of the drilling and simultaneously cooperate in the removal of the waste material in a manner already described.

It is also possible to suck in the fluid submitted to pressure together with the drill waste in addition to the positive removal provided along the helical strip.

When the compressed fluid is air alone, it is preferable, in order to avoid any risk of silicosis, to suck in the waste material by means of an independent arrangement 23 lying on the ground and similar to a further arrangement 19 which serves for injecting the fluid under pressure into the boring system, as illustrated in dot-and-dash lines at the upper part of Fig. 4.

An improvement is disclosed in the embodiment illustrated in Figs. 7 to 9, in which embodiment the releasing of the cutting edge is made possible by driving the steel shank at the desired speed with a view to overcoming the wedging resistance of the cutting edge, to further the drive of the steel shank during its rotation and possibly to provide for the rotation of said steel shank without any further arrangement being required therefor.

The cutting edge 5 is shown in this embodiment as engaging the bore hole wall. It is secured to the end of the steel shank 4, while inside the tube 10 is provided a coaxial tube 24 extending upwardly towards the upper end of the main tube 10 to form the driving means for the steel shank. The tube 24 is driven by mechanism 20a—21a as in Fig. 4 and normally at a speed different from that of the tube 10 from which it is separated by a ball bearing or a bushing 25 at its upper end and by a similar ball bearing or bushing 26 at its lower end. As in the precedingly described embodiments, the fluid under pressure constituted by air and/or water is introduced inside the inner tube 24 and the waste material is removed between the main outer tube 10 and the wall of the bore hole, as illustrated by the arrows.

The means for releasing the cutting edge in the case where the latter is wedged inside the bore hole, include, on one hand, a member driving the steel shank positioned at the upper end of the inner tube 24 and, on the other hand, a stop acting also as a passageway for the injection of fluid under pressure towards the end of the steel shank connected with the cutting edge. This member and this stop may be used selectively or else together as illustrated.

The first part of these means for releasing the cutting edge, which is positioned, as disclosed, at the upper end of the tube 24, is constituted in the embodiment illustrated by a ratchet wheel 29 with six pawls 27 comprising each an inner cylindrical end 28 rockably fitted in a correspondingly shaped recess provided in the hub of the ratchet shown at 29 and that is rigid with the steel shank 4, the axes of said pawls and recesses being parallel with the axis of the ratchet and of the steel shank carrying the latter. The outer ends 30 of the different pawls 27 engage the inner wall of the tube 24 that is serrated, the ridges of the serrations being parallel with the axis of the steel shank. These ends 30 are urged permanently against the serrations by corresponding springs 31, the tube 24 revolving in the same direction as the steel shank 4, i. e. in the direction shown by the arrow f in Fig. 8.

The second part of the means for releasing the cutting edge is constituted at the lower end of the arrangement by a stop 32 rigid with the steel shank 4 and the vertical path followed by which is limited on one hand by a shoulder part 33 and, on the other, by a part 34 forming a rotula cap, both said parts 33 and 34 being rigid with the inner tube 24 surrounding the steel shank. The shoulder 33 is bored throughout to form channels 35 parallel with the axis of the steel shank and through which the compressed fluid is adapted to flow. Similar channels 36 are also provided in the rotula cap, 34. A rotula 37, housed in the cap 34 to serve as a bushing, is fitted over the steel shank 4, to allow the movements of the steel shank. Furthermore, the stop member 32 is provided with radial channels 38 which serve for the passage of a further amount of fluid under pressure into the axial bore 39 provided throughout the length of the steel shank 4 and adapted to feed fluid under pressure to the cutting edge 5.

The inner tube 24 is held inside the tube 10 at both ends of the latter, viz. by a collar 40 at its upper end and by a collar 41 at its lower end. On the other hand, it is obvious that the tube 24 is stayed at intervals inside the tube 10.

As in the precedingly described embodiments, the steel shank 4 is held inside the bore hole by guiding sleeves 16. These sleeves may also be provided inside the tube 24, as shown at 16' in Fig. 7. In said embodiment, the slots for the removal of the waste material are done away with.

The outside of the tube 10 is again provided with blocks 15 and with projecting parts 17 as in the precedingly disclosed embodiment. The projections 17, located at the lower end of the tube 10, may assume the shape of hard metal points or of diamonds distributed in annular formation both at the periphery of the tube 10 and along its lower edge, with a view to drilling the bore hole and to cutting into the rock those points at which the cutting edge may, for any reason whatever, have failed to engage the rock to a sufficient extent.

The operation of the above disclosed arrangement is as follows: when, for any reason whatever, the cutting edge is wedged inside the bore hole, the serrations on the tube 24 carry along with them the steel shank 4, so as to overcome this wedging action, and the driving of the steel shank is thus performed through the ends 30 of the pawls 27 at the desired speed, which releases the cutting edge 5 that may resume its rotary speed by reason of the additional power supplied by the tube 24, which makes thus up for the lack of power of the machine driving the steel shank.

In the case where the steel shank acts only through percussion, the rotation of the steel shank is produced solely by the tube 24 through the agency of the pawls 27.

In addition to the above referred-to releasing action, the inner tube 24 may also provide for the drive of the steel shank without any further means being required for the latter.

The system disclosed, which is adapted to carry out its boring action in all directions, is intended more particularly for boring operations, wherein the steel shank and its cutting edge act through percussion and/or through rotation. In such cases, there is no bore specimen formed, whereby the material is removed gradually without it being necessary to remove the drilling system out of the bore hole as often as it is necessary in the case of drillings providing for the formation of a specimen. This arrangement allows consequently drilling down sections that are much longer than in the case of machines forming specimens which have to be removed frequently, whereby it is possible to drill uninterruptedly and without having to remove the system out of the bore hole as long as the cutting edge has not been submitted to a considerable wear or until it has been damaged for any reason whatever.

What I claim is:

1. A rock drill adapted to inject fluid into a bore hole and to continuously extract boring wastes comprising a rotary drill stem centrally positioned in the bore hole and the rotation of which is effected from outside the bore hole, a cutting head carried by the drill stem for cutting the bottom of the bore hole, a rotating tube rotated independently of the drill stem, said tube concentrically surrounding the drill stem and extending from the upper portion of the bore hole down to the bottom of the bore hole for conducting a fluid under pressure to the bottom of the borehole, said tube having an external diameter less than the diameter of the bore hole to provide a space between the external surface of the tube and the wall of the bore hole for the discharge of boring waste from the bore hole, means maintaining the tube concentrically spaced from the wall of the bore hole, and an auxiliary mechanism for imparting rotary movement to the drill stem from the rotating tube upon jamming of the cutting head in the bore to effect restarting of the rotary movement of drill stem.

2. A rock drill according to claim 1 in which the drill stem is provided with a stop element rigid therewith and in which means are provided on the tube for limiting relative axial movement between the tube and drill stem.

3. A rock drill adapted to inject fluid into a bore hole and to continuously extract boring wastes comprising a rotary drill stem centrally positioned in the bore hole and the rotation of which is effected from outside the borehole, a cutting head carried by the drill stem for cutting the bottom of the bore hole, a rotating tube rotated independently of the drill stem, said tube concentrically surrounding the drill stem and extending from the upper portion of the bore hole down to the bottom of the bore hole for conducting a fluid under pressure to the bottom of the borehole, an outer tube concentrically surrounding the rotary tube, bearing means interposed between the inner and outer tubes to enable the tubes to be rotated relatively to each other, means positioning the outer tube concentrically in the bore with the outer surface of the outer tube in spaced relation to the wall of the bore hole to provide a passage for upward movement of boring waste from the bottom of the bore hole, and an auxiliary mechanism for imparting rotary movement to the drill stem from the rotating tube upon jamming of the cutting head in the bore to effect restarting of the rotary movement of drill stem, said mechanism including a pawl and ratchet, a stop element rigid with the drill stem and means carried by the inner tube for cooperating with the stop for limiting relative axial movement between the stem and tube.

4. A rock drill according to claim 3 in which the means carried by the inner tube for cooperation with the stop comprises a shoulder rigid with the inside of the inner tube, to slide longitudinally of the drill stem above the stop and provided with longitudinal channels for the passage of the fluid under pressure and a lower longitudinally channelled part rigid with the inside of the lower end of the inner tube and slidably carried by the drill stem underneath said stop.

5. A rock drill according to claim 4 in which the drill stem is provided with an axial bore throughout its length for the passage of fluid under pressure and the stop is provided with radial bores connecting said axial bore of the stem with the annular space between said stem and the inside of the inner tube.

6. A rock drill according to claim 1 in which the drill stem is provided with a stop element rigid therewith and in which means are provided on the tube for limiting relative axial movement between the tube and drill stem, said last recited means comprising a shoulder rigid with the inside of the inner tube to slide longitudinally of the stem above the stop and provided with longitudinal channels for the passage of the fluid under pressure, a cap provided with longitudinal channels and rigid with the lower end of the inside of the inner tube, said cap having a sphere receiving socket in the center thereof, and a spherical member slidably mounted on the drill stem and mounted in said socket.

7. A rock drill according to claim 1 comprising a ball and socket joint means connecting the lower end of the tube with the drill stem.

References Cited in the file of this patent

UNITED STATES PATENTS

| | | |
|---|---|---|
| 1,338,460 | Morrison | Apr. 27, 1920 |
| 1,391,626 | Gilthorpe | Sept. 20, 1921 |
| 2,336,029 | Ogarrio | Dec. 7, 1943 |
| 2,611,583 | Ellis | Sept. 23, 1952 |